United States Patent
Kim

[19]

[11] Patent Number: 6,095,540

[45] Date of Patent: Aug. 1, 2000

[54] ROTARY DRIVE MEANS FOR FRONT WHEEL DRIVE BICYCLE

[76] Inventor: Young S. Kim, 208 Midland Ave., Wayne, Pa. 19087

[21] Appl. No.: 09/274,526

[22] Filed: Mar. 23, 1999

[51] Int. Cl.⁷ ........................................................ B62M 1/02
[52] U.S. Cl. ............................................ 280/259; 280/260
[58] Field of Search .................................... 280/259, 260, 280/270, 249, 250, 230, 233; 180/223

[56] References Cited

U.S. PATENT DOCUMENTS

| | | | |
|---|---|---|---|
| 4,943,077 | 7/1990 | Lin et al. | 280/260 |
| 5,184,838 | 2/1993 | Becoat | 280/259 |
| 5,224,725 | 7/1993 | Erlston | 280/259 |
| 5,299,819 | 4/1994 | Leu | 280/260 |
| 5,316,327 | 5/1994 | Bell | 280/260 |
| 5,397,142 | 3/1995 | Schwarzenbacher | 280/260 |

*Primary Examiner*—Brian L. Johnson
*Assistant Examiner*—Tony Winner

[57] ABSTRACT

A rotary drive for a front wheel gear drive bicycle is described in which a front wheel gear assembly disposed on the hub of the front wheel, a torque balancing gear assembly disposed to the head tube of the bicycle, and a pedal gear assembly incorporated into the crank axle at the bottom bracket. They are all interconnected by a rigid coupling and a conventional multiple speed gear assembly can be incorporated in the system to select a preferred riding speed. The front wheel gear assembly, together with the torque balancing gear assembly, allow an efficient front wheel drive with smooth and stable steering and provides a mechanism for a true all terrain bicycle.

5 Claims, 2 Drawing Sheets

ROTARY DRIVE MEANS FOR FRONT
WHEEL DRIVE BICYCLE

CROSS REFERENCE TO RELATED
APPLICATIONS

Not Applicable

STATEMENT REGARDING FEDERALLY
SPONSORED RESEARCH OR DEVELOPMENT

Not Applicable

REFERENCE TO A MICROFICHE APPENDIX

Not Applicable

BACKGROUND OF THE INVENTION

The present invention is related in general to a bicycle or a multicycle powered by pedals, by a motor or a combination of the two power sources. Specifically, it is related to a total gear rotary drive system coupled to a front wheel of a bicycle or multicycle.

A conventional bicycle has a rear wheel chain drive mechanism which is complex and unstable and riders experience frequent derailing problems. Also, and more importantly, the rear wheel drive system contributes to unstable steering and difficulty in controlling the bicycle as riders go up hill or turn into sharp curves particularly on rough terrain, such as grass, gravel, sand, mud, water, or snow, since pushing a front wheel on such road conditions is less efficient than pulling or driving itself.

The prior devices for front wheel drive bicycles have all used chain mechanisms attached to the front handle bars and are operated by one or both hands (Cheng et al. of U.S. Pat. No. 5,820,151, Ehrbar of U.S. Pat. No. 5,385,359 and Phillips of U.S. Pat. No. 4,773,662). These devices appear to be inefficient, unstable, and even dangerous.

The other prior device (Chalfant of U.S. Pat. No. 5,542,689) uses a rocking mechanism built on the front handle bar which connects to the front wheel by a chain. It also appears to be an unstable and inefficient bicycle to operate.

BRIEF SUMMARY OF THE INVENTION

The present invention is distinctly different from the driving mechanism of a conventional bicycle in three ways:
It includes;
1) no chain mechanism,
2) a total gear system,
3) a front wheel drive mechanism.
Also, in the present invention, pedal power, motor power, or a combination of the two power sources can be applied.
The present invention includes:
a front wheel gear assembly disposed to the front wheel hub which rotates the front wheel,
a torque balancing gear assembly disposed to the head tube of a bicycle which equally distributes the driving power from the pedal gear assembly to both side of the front gear assembly to balance and stabilize the front wheel, and
a pedal gear assembly incorporated into the pedal crank axle at the bottom bracket of a bicycle frame which generates a rotating motion by pedals.
Also, a conventional multiple speed gear assembly can be incorporated between the torque balancing gear assembly and the power source to select a speed of the bicycle.

As contrasted with the prior arts wherein the rear or front wheel of a bicycle is operated by a flexible coupling means, namely a chain, the present invention uses a rigid coupling means comprising various gears and shafts coupling the drive means to the front wheel to convey the driving power.

The torque balancing gear assembly which distributes the driving power equally to both sides of the front wheel bevel gears and maintains the balance and stability of the front wheel while the bicycle is in operation. When a momentary unequal rate of rotation occurs on the front bevel gears as the vehicle is steered in one direction or another, the unequal rotation can be counteracted by the built in ratchet mechanism in both bevel gears which has a similar mechanical structure as the free wheeling mechanism of a conventional bicycle.

The ratchet mechanism functions similarly to the differential gear unit in an automobile drive train and provides smooth steering, and also allows a free wheeling motion while a bicycle is in operation.

All gear assemblies are covered by protective casings which are not shown in the figures. Also, common bearings and fasteners are not numbered.

DETAILED DESCRIPTION

Figure 1:
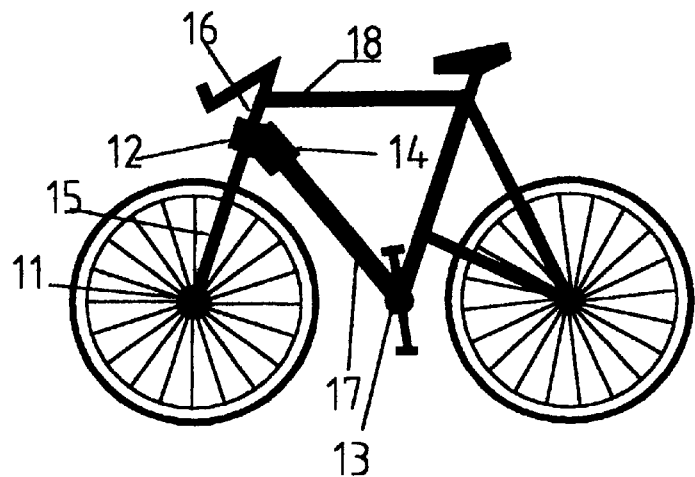
FIG. 1 shows an over all view of the bicycle with the preferred embodiment of the invention.

A typical embodiment of the present invention is shown in FIG. 1 which shows a preferred positions of each gear assembly. The front gear assembly 11 is disposed on the front wheel hub (43 in FIG. 3) and at the end of the front fork 15, the torque balancing gear assembly 12 is disposed on the head tube 16 which is attached to the top tube 18 of the bicycle, and the pedal gear assembly is incorporated into bottom bracket 13. The pedal power is conveyed by rigid coupling means consisting of gears and shafts (30 in FIG. 2) enclosed in down tube 17. A conventional multiple speed gear assembly 14 in FIG. 1 can be incorporated into the torque balancing gear assembly or into the pedal gear assembly.

Figure 2:
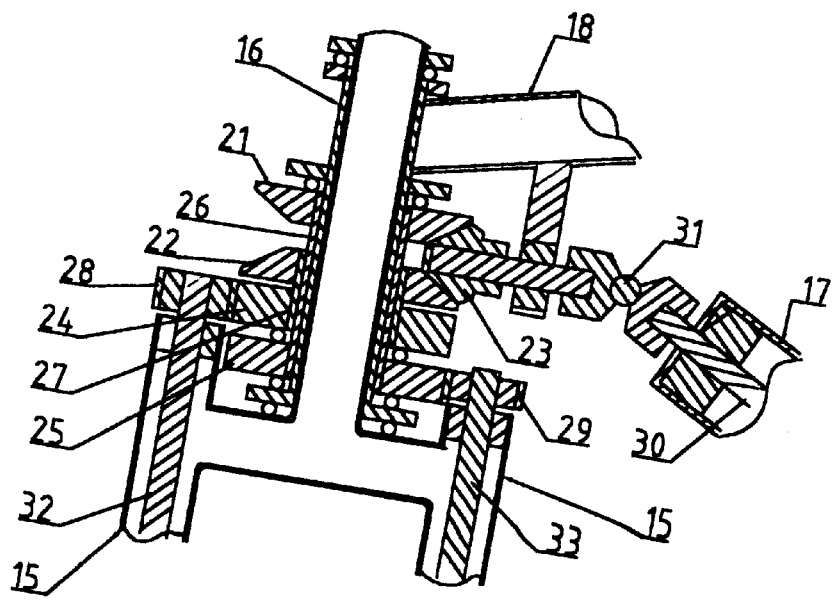
FIG. 2 shows an internal view of the torque balancing gear assembly disposed on the head tube of a bicycle. The front fork has been turned at a 90 degree position to show the small spur gears positioned on both sides of the front fork shoulder.

FIG. 2 shows the internal gear arrangement of the torque balancing gear assembly which includes;
a pair of identical bevel gears, 21 and 22, facing each other and rotate in opposite directions from each other at same rotation rate by meshing with the pinion gear 23 simultaneously. The pinion gear 23 is connected to the rotary power source through the universal joint 31 and multiple speed gear assembly 14. The bevel gear 21 is connected to the spur gear 25 by the tubular connector 26 and rotates on the head tube 16, and the bevel gear 22 is connected to the spur gear 24 by the tubular connector 27 and rotates on the tubular connector 26.

Consequently, the spur gears 24 and 25 rotate in opposite directions from each other at same rotation rate as the bevel gears. The spur gears 24 and 25 engage with the small spur gears 28 and 29, respectively, which are on each side shoulder of the front fork 15. Accordingly, both small spur gears also rotate in opposite directions from each other at same rotation rate, and connected to the pinion gears of the front gear assembly (FIG. 3).

The front wheel gear assembly disposed axially on the front wheel hub has two identical bevel gears, one on each side, with a built in ratchet mechanism which provides free wheeling functionality as the rear wheel of a conventional bicycle, and two identical pinion gears meshing with each bevel gear at the each end of the front fork.

Figure 3:
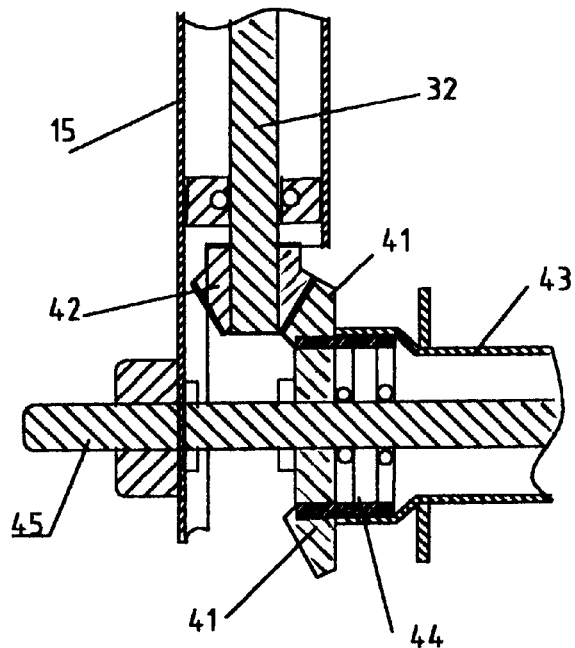
FIG. 3 shows an internal view of one side of the front wheel gear assembly disposed to the front wheel hub. Both sides of the gear arrangement are mirror images to each other.

FIG. 3 shows the internal gear arrangement of one side of the front wheel gear assembly. The other side is a mirror image of FIG. 3. The bevel gear 41 having a built in ratchet mechanism 44 is disposed on the hub 43 rotating on the axle 45 and engages with the pinion gear 42 which is connected to the small spur gear of the torque balancing gear assembly (28 or 29 in FIG. 2) by the small gear shaft 32 (or 33) in the front fork 15.

Since the two pinion gears on each end of the front fork rotate in opposite directions with the same rotation rates as the small spur gears 28 and 29 in FIG. 2, both bevel gears on the front wheel hub should rotate in the same direction to rotate the front wheel forward.

Figure 4:
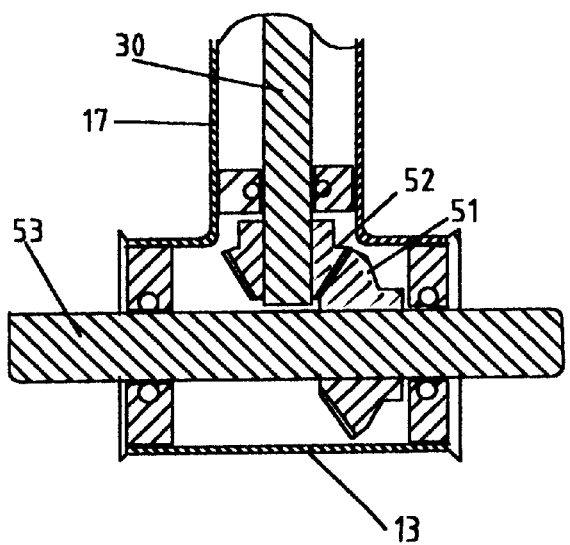
FIG. 4 shows an internal view of the pedal gear assembly which is incorporated and enclosed in the bottom bracket of the bicycle.

FIG. 4 shows the internal gear arrangement of the pedal gear assembly which includes a pair of bevel gears 51 and 52 which mesh with each other. The bevel gear 51 is attached to the pedal crank axle 53 and the bevel gear 52 is attached to the power transmission shaft 30 in the down tube 17 and is connected to the multiple speed gear assembly (14 in FIG. 1). The pedal gear assembly can be inside bottom bracket 13.

Operation:

Operation of the bicycle may be visualized as follows; Upon rotating pedals, or operating motor, the rotation power is transferred to the multiple speed gear assembly 14 by the power transmission shaft 30 in the down tube 17. The output power from the multiple speed gear assembly is conveyed to the pinion gear 23 which imparts rotation of the bevel gears 21 and 22 simultaneously in opposite directions from each other at the same rotation rate. The spur gear 24 and 25 also rotate in the opposite direction at a same speed as the bevel gears as each bevel gear and spur gear are connected as described above. The spur gears 24 and 25 impart the rotation of the small spur gears 28 and 29 respectively, which are connected to the pinion gears of the front gear assembly by the small gear shafts 32 and 33 in the front fork 15 (FIG. 2). The pinion gears of the front gear assembly rotate in the opposite direction at the same rotation rate as the small spur gears. Consequently, both bevel gears in the front gear assembly rotate in same direction and the same rate, which causes the front wheel to rotate forward.

This mechanism should stabilize the front wheel while the bicycle is in operation.

As described above, the built-in ratchet mechanism in both bevel gears of the front gear assembly should make the steering smooth and maintain the stability of the front wheel while the bicycle is in motion, and also allows free wheeling of the front wheel.

In order to improve the smoothness of the steering movement, both spur gears 24 and 25 in FIG. 2 can include built in ratchet mechanism similar to the bevel gears in the front wheel gear assembly. Each gear assembly is securely enclosed so that the gears are well protected from dust and other external hazards. Such covers and every fasteners are not shown in the figures. Also, bearings and other supporting parts are not numbered.

The advantage of a front wheel drive vehicle, in general, is well understood as seen in the popularity of contemporary front wheel drive automobiles. The present invention should have similar advantages and more as summarized below.

1. efficient front wheel drive, particularly at upward inclines and hilly surfaces,
2. efficient and stable steering at sharp curves,
3. efficient and effective handling and control on rough road surfaces,
4. there are no chains to be derailed or tangled with hazardous materials on the road,
5. no chain connection to the rear wheel which makes it easy to separate the wheel and carry the bicycle.

Although preferred embodiments of the invention have been described in the above detailed description and illustrated in the drawings, it will be understood that the invention is not limited to the embodiments disclosed, but is capable of rearrangements, modifications, and substitutions of parts and elements without departing from the spirit of the invention.

For example, the present invention can be applied to construct an all wheel drive bicycle by adding a rear wheel drive mechanism similar to the front wheel drive gear assembly. Accordingly, the present invention is intended to encompass such rearrangements and modifications as they fall within the spirit and scope of the appended claims.

What is claimed is:

1. A front wheel drive bicycle comprising;
   drive means for driving, said front wheel;
   a down tube and a front fork connecting said front wheel to said drive means, and
   rigid coupling means disposed in said down tube and said front fork, and coupled for transmitting rotation of said drive means to said front wheel; and said drive means, including; a torque balancing gear assembly disposed on a head tube of said bicycle, a front wheel gear assembly disposed axially on a hub of said front wheel, a pedal gear assembly disposed into a bottom bracket of said bicycle, and a multiple speed gear assembly disposed between said torque balancing gear assembly and said pedal gear assembly.

2. The front wheel drive bicycle in claim 1 wherein; said torque balancing gear assembly disposed axially on said head tube includes;
   a pair of identical bevel gears facing each other rotating in opposite directions to each other by meshing with a pinion gear disposed between said bevel gears and connected to a rotary power source by said rigid coupling means, and
   a pair of identical spur gears connected to each said bevel gear by concentric tubular connectors, rotating in opposite directions from each other and meshing separately with each of small spur gears disposed on each side shoulder of said front fork and connected to each pinion gear of said front wheel gear assembly by small gear shafts.

3. The front wheel drive bicycle in claim 1 wherein: said front wheel gear assembly comprising;
   a pair of identical bevel gears with built in ratchet mechanism disposed on each side of said hub of said front wheel, and
   a pair of identical said pinion gears at each end of said front fork meshing separately with each said bevel gear on each side of said hub and connected to each of said small spur gears of said torque balancing gear assembly, whereby said pinion gears connected to said small spur gears rotate with an equal rotation rate but in opposite directions each other and impart rotation of both said bevel gears in the same direction to rotate said front wheel forward.

4. The front wheel drive bicycle in claim 1 wherein;

said pedal gear assembly includes;

a pair of bevel gears meshing with each other and one of said bevel gear is axially attached to a pedal crank axle and the other said bevel gear is axially attached to said power transmission shaft in said down tube and connected to said torque balancing gear assembly through said multiple speed gear assembly.

5. A front wheel drive bicycle comprising; drive means for driving, when operated, said front wheel a down tube and a front fork connecting said front wheel to said drive means, and rigid coupling means disposed in said down tube and said front fork, and coupled for transmitting rotation of said drive means to said front wheel; and said rigid coupling means including; a power transmission shaft with a pinion gear in said down tube, a small gear shaft with a pinion gear in tubes of said front fork.

\* \* \* \* \*